United States Patent
Dolle et al.

(10) Patent No.: US 6,362,298 B2
(45) Date of Patent: *Mar. 26, 2002

(54) HIGH-MOLECULAR-WEIGHT POLYPROPYLENE HAVING A BROAD MOLECULAR-WEIGHT DISTRIBUTION

(75) Inventors: Volker Dolle, Bensheim (DE); Eduardo Chicote Carrion, Tarragona (ES); Herbert Terwyen, Frankfurt (DE)

(73) Assignee: Basell Polypropylen GmbH (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/804,063

(22) Filed: Feb. 21, 1997

(30) Foreign Application Priority Data

Feb. 22, 1996 (DE) .......................... 196 06 510

(51) Int. Cl.[7] .............................................. C08F 210/16
(52) U.S. Cl. ....................... 526/348; 526/65; 526/125.3; 526/905; 526/351
(58) Field of Search ........................... 526/65, 905, 348, 526/125.3

(56) References Cited

U.S. PATENT DOCUMENTS

| 4,970,280 A | * 11/1990 | Chiba et al. ................. 526/905 |
| 5,350,817 A | 9/1994 | Winter et al. ................ 526/119 |
| 5,438,110 A | * 8/1995 | Ishimara et al. ......... 526/125.3 |
| 5,536,789 A | 7/1996 | Schwager et al. ........... 525/322 |

FOREIGN PATENT DOCUMENTS

| DE | 4019053 | 12/1991 | |
| EP | 0 339 804 | 11/1989 | |
| EP | 0 498 603 | 8/1992 | |
| EP | 498603 | * 8/1992 | ................. 526/905 |
| EP | 0 516 018 | 12/1992 | |
| EP | 0573862 | 5/1993 | |
| EP | 569078 | * 11/1993 | ................. 526/128 |
| EP | 0 600 246 | 6/1994 | |
| JP | 54-38389 | * 3/1979 | ................. 526/905 |
| JP | 59-172507 | * 9/1984 | ................. 526/65 |
| JP | 2-232207 | * 9/1990 | ................. 526/65 |
| WO | WO 91/14718 | 10/1991 | |
| WO | WO 96/11216 | 4/1996 | |

OTHER PUBLICATIONS

Translation of Japanese Hei 2[1990]232207.*

* cited by examiner

Primary Examiner—David W. Wu
Assistant Examiner—Caixia Lu
(74) Attorney, Agent, or Firm—Connolly Bove Lodge & Hutz LLP

(57) ABSTRACT

The invention relates to a high-molecular-weight copolymer comprising ethylene and propylene units which has an ethylene content in the range from 1 to 10% by weight, a melt flow rate MFR (230/5) of <5 dg/min and a molecular-weight distribution $M_w/M_n$ in the range from 6 to 20. The invention also relates to a process for the preparation of the copolymer in the presence of a catalyst, an organoaluminum compound (B) and an organosilicon compound (C), in which the polymerization is carried out in two reaction steps, where the suspension medium in the first step is simultaneously the monomer, and a polypropylene having a viscosity of from 500 to 1400 ml/g which makes up a proportion of from 20 to 80% of the total polymer is prepared in the first reaction step.

20 Claims, No Drawings

HIGH-MOLECULAR-WEIGHT POLYPROPYLENE HAVING A BROAD MOLECULAR-WEIGHT DISTRIBUTION

The present invention relates to high-molecular-weight copolymers comprising ethylene and propylene units which have an ethylene content in the range from 1 to 10% by weight.

The invention also relates to a process for the preparation of these polymers, and to moldings, such as pipes, fittings, hollowware and sheets, made from said polymers.

DE-A-40 19 053 discloses homopolymers having a broad molecular-weight distribution. These homopolymers can be converted into pipes with great difficulty. However, pipes produced in this way have the disadvantage of being very brittle and having a rough surface, which means that they are not suitable for practical use.

EP-A-573 862 discloses a process for the preparation of polypropylene having a molecular-weight distribution $M_w/M_n$ of >20 and good processing properties. The melt flow index is 2 dg/min; the intrinsic viscosity is 280 ml/g. The polypropylene described in this way is prepared by gas-phase polymerization. Examples 1 to 4 of EP-A-573 862 describe the preparation of a homopolypropylene powder having a broad molecular-weight distribution. Although none of the examples indicate the polydispersity $M_w/M_n$, the intrinsic viscosity data (800 ml/g and 67 ml/g) suggest a very broad molecular-weight spread in the first and second steps.

The processes described in the prior art (EP-A-573 862) have been repeated in order to enable testing of the properties of the materials. It has been found that all raw materials are very brittle and have restricted processing quality and material inhomogeneity. The production of PP pipes by a conventional extrusion process was in some cases impossible since the viscosity of the melt was inadequate for an extrusion process.

The object of the present invention was to find an improved molding composition which allows pipes having low brittleness and a smooth surface and in addition high toughness and good rigidity in combination with excellent creep rupture strength to be produced using conventional production tools.

This object is achieved by copolymers of the generic type mentioned at the outset which have a melt flow rate MFR (230/5) of <2 dg/min and a molecular-weight distribution $M_w/M_n$ in the range from 6 to 20.

Surprisingly, it has been found that the novel propylene-ethylene copolymers can be converted, using conventional production tools, into pipes which have smooth finished surfaces, good processing quality, high impact strength, good hardness and good creep rupture strength.

The invention also relates to a process for the preparation of the propylene/ethylene copolymers by copolymerization of propylene and ethylene, if desired with a further 1-olefin having 4 to 20 carbon atoms, in suspension at a temperature in the range from 30 to 150° C., a pressure of from 10 to 100 bar and a residence time of from 30 min to 6 h, in the presence of a commercially available catalyst (for example catalyst FT4S from Montell, Milan, Italy wherein FT 4 S comprises a titanium halide and an electron donor supported on an active $MgCl_2$), an organoaluminum compound (B) and, if desired, an organosilicon compound (C), which comprises carrying out the polymerization in two reaction steps, where the suspension medium in the first step is both monomer and suspension medium and a polypropylene having a viscosity of from 500 to 1400 ml/g which makes up a proportion of from 20 to 80% of the total polymer is prepared in the first reaction step, and where the total polymer after the second reaction step has a viscosity of from 400 to 700 ml/g and a polydispersity $M_w/M_n$ of from 6 to 20.

In the first reaction step, a high-molecular-weight product having a viscosity of from 500 to 1400 ml/g which makes up a proportion of from 20 to 80% by weight, preferably from 45 to 75% by weight, particularly preferably from 48 to 65% by weight, of the total polymer is prepared, while in the second reaction step, a low-molecular-weight product having a viscosity of from 200 to 400 ml/g which makes up a proportion of from 80 to 20% by weight, preferably from 55 to 25% by weight, particularly preferably from 52 to 35% by weight, is prepared.

The polymerization is carried out by a bulk process in two reaction steps, where the monomer, the propylene, is simultaneously starting material and suspension medium.

The novel process is carried out as a two-step polymerization with prior prepolymerization. Both the first and the second reaction steps and the prepolymerization can be carried out either batchwise or continuously. Continuous mode is preferred.

Component B and component C are mixed with one another before the prepolymerization and then brought into contact with the catalyst. Propylene is prepolymerized in suspension or in bulk in the presence of these active components. The prepolymerization is preferably carried out in the liquid monomer. The residence time is from 4 to 10 minutes, and the prepolymerization temperature is in the range from 10 to 25° C.

The prepolymer is then introduced into the first reaction step of the polymerization, where it is polymerized in liquid propylene at a temperature of from 55 to 100° C. and at a residence time of from 0.5 to 3.5 h. A phase ratio in the range from 2.5 to 4 l of liquid propylene per kg of PP, preferably of 3.3 l of liquid propylene per kg of PP, is established. In the first reaction step, ethylene is metered in continuously in such a way that a $C_2$ concentration in the liquid phase of from 0.1 to 20% by weight, preferably from 0.1 to 10% by weight, is established. Hydrogen is metered in for molecular-weight regulation.

After the first reaction step, the multiphase system is transferred into the second reaction step, where it is polymerized at a temperature of from 55 to 100° C. The second reaction step is carried out in a second reactor, where a phase ratio of from 1 to 2.5 l of liquid propylene per kg of PP, preferably of 1.9 l of liquid propylene per kg of PP, is established. It is preferred in accordance with the invention to establish different phase ratios in the two reactors in the process described here. As described above, ethylene and $H_2$ are likewise metered in.

The temperatures, hydrogen concentrations and ethylene concentrations in the two reactors can be identical or different. Suitable reactors are stirred reactors or loop reactors.

It is possible to decompress the monomer between the two reactors and to meter the catalyst/PP system, which is still polymerization-active, into the second reactor. It is also possible to set a lower hydrogen concentration in the second reactor than in the first reactor.

Component B is trimethylaluminum, triisobutylaluminum or triethylaluminum. Triethylaluminum or triisobutylaluminum is preferred. Triethylaluminum is particularly preferred.

Component C is cyclohexylmethyldimethoxysilane, bis-cyclopentyldimethoxysilane or diphenyldimethoxysilane. Cyclohexylmethyldimethoxysilane or biscyclopentyi-dimethoxysilane is particularly preferred.

Component B is employed in a concentration of from 0.001 to 10 mmol/l, preferably from 0.1 to 5 mmol/l. Component C is employed in a ratio R with respect to component B. The ratio is calculated from the quotient of concentration B and concentration C, in each case in mol/l. The ratio is from 1 to 200, preferably from 2 to 100, particularly preferably from 2.5 to 75.

Preference is given in accordance with the invention to products having an MFR (230/5) of 0.01 to 5 dg/min, particularly preferably from 0.02 to 2 dg/min. The copolymer of the invention consists of from 1.0 to 10% by weight of ethylene units and from 99 to 90% by weight of propylene units.

After the second reaction step, the mixture of propylene, hydrogen and ethylene is worked up. Preference is given to rapid evaporation of the liquid monomer in one step. The purified copolymer is subsequently dried in a stream of inert gas, and it is ensured that the copolymer is free from monomer. The resultant high-molecular-weight copolymer is mixed with stabilizers, lubricants, fillers, pigments, etc. and granulated. The granulation is carried out in an extruder or compounder.

The evaporated monomer mixture is condensed and separated by distillation into ethylene, propylene and hydrogen. The distillation should be designed so that a hydrogen concentration of <150 ppm, preferably <80 ppm, is ensured. The monomer purified in this way is then metered back into the first reactor.

The examples below are intended to illustrate the invention. The products prepared were characterized by the following polymer-analytical methods:

| | |
|---|---|
| Melt flow rate MFR (230/5) | in accordance with DIN 53735 |
| Viscosity number [ml/g] | determined at 135° C. in decalin |
| Creep rupture strength | in accordance with DIN 53759 |
| Impact strength | in accordance with DIN 8078 |

EXAMPLE 1

The polymerization is carried out continuously in two stirred reactors, each with a capacity of 16 l, connected in series. Each reactor is charged with 10 l of liquid propylene. Cocatalyst B used is triethylaluminum in a concentration of 1 mmol/l; the concentration of the stereoregulator (C) is 0.1 mmol/l. The stereoregulator (C) used is cyclohexylmethyldimethoxysilane. The hydrogen concentration in the liquid phase is set at 60 ppm by vol.

A mixture of propylene and ethylene is polymerized in the first reactor at 70° C. in the presence of the Montell FT4S catalyst. The catalyst, cocatalyst, ethylene, propylene and hydrogen are topped up continuously. 15 g of ethylene are metered in per kg of propylene. The polymerization is continued to a solids content of 224 g of polypropylene per liter of suspension. This gives a phase ratio of 3.3 l of liquid propylene per kg of polypropylene. Hydrogen is metered in at such a rate that a concentration of 60 ppm is established in the liquid phase.

The polypropylene obtained in the first reactor is transferred into the second reactor together with the catalyst. Ethylene, hydrogen and propylene are metered into the second reactor. 15 g of ethylene are metered in per kg of propylene. The $H_2$ concentration in the liquid phase is 420 ppm by vol. The reaction temperature in the second reactor is likewise 70° C. The polymerization is continued to a solids content of 324 g of PP per liter of suspension. This gives a phase ratio of 1.9 l of liquid propylene per kg of polypropylene.

After the polymer has been isolated as a powder from the second reactor, a catalyst yield of 26 kg of polypropylene/g of catalyst is obtained. A molecular-weight distribution $M_w/M_n$ of 9.0, an MFR value of 0.8 dg/min, and a viscosity number of 630 ml/g are measured. A $C_2$ incorporation of 3.6% by weight is measured by IR spectroscopy. The content soluble in cold xylene is measured at 7.9% by weight.

Comparative Example 1

The procedure was as in Example 1. However, the phase ratio of liquid propylene in l per kg of polypropylene was set to the same value in reactor 1 and reactor 2; the same hydrogen concentration was set in the two reactors. A value of 4.0 was determined for $M_w/M_n$.

EXAMPLE 2

The powder obtained from Example 1 was granulated at about 240° C. under an inert gas in a twin-screw extruder with a screw diameter of 53 mm, with addition of 0.15% of ®Irganox 1010 and 0.15% of ®Hostanox PAR 24 as stabilizers. In addition, a dye mixture was added. The granules obtained were subjected to an $M_w/M_n$ determination. $M_w/M_n$ was 8.0.

Comparative Example 2

The powder obtained from Comparative Example 1 was granulated at about 240° C. under an inert gas in a twin-screw extruder with a screw diameter of 53 mm, with addition of 0.15% of ®Irganox 1010 and 0.15% of ®Hostanox PAR 24 as stabilizers. In addition, a dye mixture was added. The granules obtained were subjected to an $M_w/M_n$ determination. $M_w/M_n$ was 3.8.

The granules obtained in this way were converted into pipes measuring 32×4.5 mm (internal diameter=32 mm, wall thickness=4.5 mm) in a pipe extrusion unit with a 60 mm grooved-barrel extruder and a vacuum spray tank. The material throughput was 150 kg/h. The material temperature was set at 210° C. The pipe surface was very rough.

EXAMPLE 3

The granules from Example 2 were converted into pipes measuring 32×4.5 mm (internal diameter=32 mm, wall thickness=4.5 mm) in a pipe extrusion unit with a 60 mm grooved-barrel extruder and a vacuum spray tank. The material throughput was 150 kg/h. The material temperature was set at 210° C.

It was observed that the processing proceeded very uniformly and the pipe surfaces, both internal and external, were very smooth. The pipe surface was characterized by comparison with pipes produced from granules having a narrow molecular-weight distribution (see Comparative Example 2; $M_w/M_n$=3.8) in the same pipe extrusion unit under identical conditions.

The impact strength of the pipes (Example 3) was good and met the requirements of DIN 8078, Section 3.5.

The pipes from Example 3 were subjected to various creep rupture strength tests in accordance with DIN 53759:

| Test temperature | Test stress | Minimum time-to-failure (nominal) | Achieved time-to-failure |
| --- | --- | --- | --- |
| 95° C. | 3.5 MPa | >1000 h | >5000 h |
| 95° C. | 3.7 MPa | >300 h | >2250 h |
| 120° C. | 2.3 MPa | >300 h | >2200 h |

The minimum times-to-failure prescribed in DIN 8078 (PP pipes) were clearly exceeded. The pipes from Example 3 have a very good creep rupture strength behavior and a very smooth surface.

Comparative Example 3

Pipes were produced from homopolypropylene granules produced with a bimodal molecular-weight distribution (preparation procedure of DE -A-40 19 053). These pipes were subjected to a creep rupture strength test in accordance with DIN 53759, and the surface quality was assessed in accordance with DIN. The pipes produced in this way were rough and failed the creep rupture strength test.

EXAMPLE 4

Propylene is polymerized to polypropylene (PP) in a polymerization plant with two reactors connected in series. The catalyst (FT4S from Montell), triethylaluminum and cyclohexylmethyidimethoxysilane are mixed with one another and prepolymerized continuously in liquid propylene in an upstream prepolymerization reactor. The mixture of catalyst, triethylaluminum, cyclohexylmethyldimethoxysilane, propylene and polypropylene is metered into the first reactor. In addition, propylene is introduced into the first reactor via a storage tank. Hydrogen and ethylene are dissolved in the liquid propylene and then metered into the reactor via this stream. A concentration of 60 ppm of hydrogen is set in the liquid propylene. 17 t/h of propylene are introduced into the first reactor. 7.5 kg of ethylene are metered in per tonne of propylene. Propylene is converted into PP in the reactor in the presence of the FT4S catalyst. The reaction mixture is removed continuously from the first reactor and metered into the second reactor. 7 t/h of propylene are metered into the second reactor. A concentration of 420 ppm of hydrogen is set in this propylene stream; a concentration of 7.5 kg of ethylene/t of propylene is set. After passing through the second reactor, the reaction mixture is worked up in a stirred vessel by decompression to 18 bar, and the PP and the gaseous components are separated from one another. The gaseous propylene is condensed, distilled and then fed back into the storage tank. 0.9 mmol of Al, 0.18 mmol of donor and 5 $\mu$mol of catalyst (measured as $\mu$mol of Ti) are metered in per liter of liquid propylene metered into the first reactor.

A phase ratio of 3.3 l of liquid propylene per kg of PP is set in the first reactor; a phase ratio of 1.9 l of liquid propylene per kg of PP is established in the second reactor. The ratio between the amounts of heat removed from the reactors is 1.4:1 (1st reactor/2nd reactor). The PP product obtained has a polydispersity $M_w/M_n$ of 7.0.

Comparative Example 4

The procedure was as in Example 5, but a phase ratio of 3.3 l of liquid propylene per kg of PP was established in the first and second reactors. The ratio between the amounts of heat removed from the reactors was 3.4:1 (1st reactor/2nd reactor).

The PP product obtained had a polydispersity $M_w/M_n$ of 4.8. The PP powder obtained was granulated as described in Example 2. Pipes were produced from the granules as described in Example 3 and subjected to a creep rupture strength test as described in Example 4. The pipes had a very rough surface and did not meet the requirements of DIN 8078, Section 3.5.

The pipes were subjected to various creep rupture strength tests in accordance with DIN 53759; the target values were not achieved.

EXAMPLE 5

The procedure was as in Example 4, but 10 kg of ethylene/t of propylene were introduced into the first reactor and 5 kg of ethylene/t of propylene were introduced into the second reactor. The PP powder obtained in this way was granulated as described in Example 2. Pipes were produced from the granules as described in Example 3 and subjected to a creep rupture strength test as described in Example 4.

The requirements of DIN 8078, Section 3.5, were met. The pipes were subjected to various creep rupture tests in accordance with DIN 53759:

| Test temperature | Test stress | Minimum time-to-failure (nominal) | Achieved time-to-failure |
| --- | --- | --- | --- |
| 95° C. | 3.5 MPa | >1000 h | >7000 h |
| 95° C. | 3.7 MPa | >300 h | >3250 h |
| 120° C. | 2.3 MPa | >300 h | >3250 h |

The minimum times-to-failure prescribed in DIN 8078 (PP pipes) were significantly exceeded. The pipes had a very good creep rupture strength behavior and a very smooth surface.

EXAMPLE 6

The procedure was as in Example 5, but 5 kg of ethylene/t of propylene were introduced into the first reactor and 10 kg of ethylene/t of propylene were introduced into the second reactor.

The pipe test showed that the requirements of DIN 8078, Section 3.5, were met. The pipes were subjected to various creep rupture strength tests in accordance with DIN 53759:

| Test temperature | Test stress | Minimum time-to-failure (nominal) | Achieved time-to-failure |
| --- | --- | --- | --- |
| 95° C. | 3.5 MPa | >1000 h | >5000 h |
| 95° C. | 3.7 MPa | >300 h | >2250 h |
| 120° C. | 2.3 MPa | >300 h | >2200 h |

The minimum times-to-failure prescribed in DIN 8078 (PP pipes) were significantly exceeded. The pipes had a very good creep rupture strength behavior and very smooth surfaces.

EXAMPLE 7

The procedure was as in Example 5, but 15 kg of ethylene/t of propylene were introduced into the first reactor and 1 kg of ethylene/t of propylene were introduced into the second reactor.

The pipe test showed that the requirements of DIN 8078, Section 3.5, were met. The pipes were subjected to various creep rupture strength tests in accordance with DIN 53759:

| Test temperature | Test stress | Minimum time-to-failure (nominal) | Achieved time-to-failure |
|---|---|---|---|
| 95° C. | 3.5 MPa | >1000 h | >7000 h |
| 95° C. | 3.7 MPa | >300 h | >3250 h |
| 120° C. | 2.3 MPa | >300 h | >3250 h |

The minimum times-to-failure prescribed in DIN 8078 (PP pipes) were significantly exceeded. The pipes had a very good creep rupture strength behavior and very smooth surfaces.

EXAMPLE 8

The procedure was as in Example 5, but 15 kg of ethylene/t of propylene were introduced into the second reactor and 1 kg of ethylene/t of propylene were introduced into the first reactor.

The pipe test showed that the requirements of DIN 8078, Section 3.5, were met. The pipes were subjected to various creep rupture strength tests in accordance with DIN 53759:

| Test temperature | Test stress | Minimum time-to-failure (nominal) | Achieved time-to-failure |
|---|---|---|---|
| 95° C. | 3.5 MPa | >1000 h | >1100 h |
| 95° C. | 3.7 MPa | >300 h | >350 h |
| 120° C. | 2.3 MPa | >300 h | >340 h |

The minimum times-to-failure prescribed in DIN 8078 (PP pipes) were significantly exceeded. The pipes had a very good creep rupture strength behavior and very smooth surfaces.

EXAMPLE 9

The procedure was as in Example 4, but dicyclopentyldimethoxysilane was used as stereoregulator in the concentration of 0.036 mmol per l of liquid propylene. 40 ppm of hydrogen were metered into the first reactor. A concentration of 3,500 mol-ppm of hydrogen was set in the inlet stream to the second reactor. A catalyst yield of 30 kg of PP/g of catalyst was established. The end product was found to have a molecular-weight distribution $M_w/M_n$ of 18.5. The MFR (230/5) value was 0.8 dg/min. 7.5 kg of ethylene per tonne of propylene were metered into both the first and second reactors.

The granulation and pipe production were carried out as described in Examples 2 and 3. The pipe test showed that the requirements of DIN 8078, Section 3.5, were met. The pipes were subjected to various creep rupture strength tests in accordance with DIN 53759:

| Test temperature | Test stress | Minimum time-to-failure (nominal) | Achieved time-to-failure |
|---|---|---|---|
| 95° C. | 3.5 MPa | >1000 h | >7900 h |
| 95° C. | 3.7 MPa | >300 h | >3550 h |
| 120° C. | 2.3 MPa | >300 h | >3500 h |

The minimum times-to-failure prescribed in DIN 8078 (PP pipes) were significantly exceeded. The pipes had very good creep rupture strength behaviour and highly smooth surfaces.

EXAMPLE 10

The procedure was as in Example 9, but 10 kg of ethylene/t of propylene were introduced into the first reactor and 5 kg of ethylene/t of propylene were introduced into the second reactor. After granulation of the powder and production of pipes from the granules as described in Examples 2 and 3, the creep rupture strength test in accordance with DIN 53759 on the resultant pipes showed that the target values were again significantly exceeded; the pipe surfaces were highly smooth, both internally and externally.

EXAMPLE 11

The procedure was as in Example 9, but 10 kg of ethylene/t of propylene were introduced into the first reactor and 5 kg of ethylene/t of propylene were introduced into the second reactor. After granulation of the powder and production of pipes from the granules as described in Examples 2 and 3, the creep rupture strength test in accordance with DIN 53759 on the resultant pipes showed that the target values were again significantly exceeded; the pipe surfaces were highly smooth, both internally and externally.

EXAMPLE 12

The procedure was as in Example 4, but diphenyldimethoxysilane was used as stereoregulator. An $M_w/M_n$ value of 6.1 was measured on the powder. The creep rupture strength test in accordance with DIN was passed; the pipe surface was smooth.

EXAMPLE 13

The procedure was as in Example 9, but 80 ppm of hydrogen were metered into the first reactor and 1500 ppm into the second reactor. An $M_w/M_n$ value of 12.5 was measured on the powder. The creep rupture strength test in accordance with DIN on pipes produced from this powder as described in Examples 2 and 3 was passed; the pipe surface was smooth.

What is claimed is:

1. A high-molecular-weight copolymer comprising ethylene and propylene units having an ethylene content in the range of from 1 to 10% by weight, a melt flow rate MFR (230/5) of $\leq 2$ dg/min and a molecular-weight distribution $M_2/M_n$ in the range of from 6 to 20.

2. A copolymer as claimed in claim 1, having a MFR (230/5) in the range of from 0.02 to 2 dg/min and a molecular-weight distribution $M_w/M_n$ in the range of from 7 to 18.

3. A copolymer as claimed in claim 2, comprising ethylene units in an amount of from 2 to 8% by weight.

4. A process for the preparation of pipes made from a high-molecular weight copolymer comprising ethylene and propylene units having an ethylene content in the range of from 1 to 10% by weight, a melt flow rate MFR (230/5) of <2 dg/min and a molecular-weight distribution $M_w/M_n$ in the range of from 6 to 20 comprising the steps of copolymerizing propylene and ethylene, optionally with a further 1-olefin having 4 to 20 carbon atoms, in suspension at a temperature ranging from 30° to 150° C., a pressure ranging from 10 to 100 bar and a residence time of from 30 min to 6 h in the presence of a catalyst, an organoaluminwm compound (B) and an organosilicon compound (C), wherein the polymerization is run in two reaction steps, wherein said polymerization is carried out in each of said two reaction steps in the presence of said catalyst and in the first step, the suspension medium is both monomer and suspension medium, and wherein a polypropylene having a viscosity number determined at 135° C. in decalin of from 500 to 1400 ml/g is prepared, which makes up a proportion of 20 to 80% of the total polymer, and further wherein the total polymer after the second reaction step has a viscosity number determined at 135° C. in dacalin of from 400 to 700 ml/g and a polydispersity $M_w/M_n$ of from 6 to 20 and wherein a low-molecular-weight polypropylene having a viscosity number determined at 135° C. in decalin of from 200 to 400 ml/g which makes up a proportion of from 55 to 25% by weight of the total polymer is prepared in the second reaction step and wherein in a subsequent third step, the resulting high molecular-weight copolymer is converted to pipes in a pipe extrusion unit and said catalyst comprises a titanium halide and an electron donor supported on an active $MgCl_2$.

5. The process as claimed in claim 4, wherein a polypropylene which makes up a proportion of from 45 to 75% by weight of the total polymer is prepared in the first reaction step.

6. The process as claimed in claim 4, wherein the process consists of two reactors.

7. A process as claimed in claim 4, wherein the proportion of the low-molecular-weight polymer prepared in the second step is of from 52 to 35% by weight.

8. The process as claimed in claim 4, wherein a prepolymerization is carried out, where component B and component C are mixed with one another before the prepolymerization and then brought into contact with the catalyst, and where propylene is prepolymerized in suspension in the presence of these active components at a residence time of from 4 to 10 minutes and at a temperature in the range of from 10 to 25° C.

9. The process as claimed in claim 4, wherein the polymerization in the first reaction step is carried out in liquid propylene at a temperature of from 55 to 100° C. and at a residence time of from 0.5 to 3.5 h.

10. The process as claimed in claim 4, wherein a phase ratio in the range from 2.5 to 4 l of liquid propylene per kg of polypropylene is established in the first reaction step.

11. The process as claimed in claim 4, wherein an ethylene concentration in the liquid phase of from 0.1 to 20% by weight is set in the first reaction step.

12. The process as claimed in claim 4, wherein the polymerization in the second reaction step is carried out at a temperature in the range from 55 to 100° C., with a phase ratio of from 1 to 2.5 l of liquid propylene per kg of polypropylene being established.

13. The process as claimed in claim 4, wherein different phase ratios are established in the first and second reaction steps.

14. The process as claimed in claim 4, wherein component B is trimethylaluminum, triisobutylaluminum or triethylaluminum.

15. The process as claimed in claim 4, wherein component C is cyclohexylmethyldimethoxysilane, biscyclopentyldimethoxysilane or diphenyldimethoxysilane.

16. The process as claimed in claim 4, wherein component B is employed in a concentration of from 0.001 to 10 mmol/l.

17. The process as claimed in claim 4, wherein component B is employed in a concentration of from 0.1 to 5 mmol/l.

18. The process as claimed in claim 4, wherein component C is employed in a ratio R with respect to component B which is calculated from the quotient of concentration B and concentration C, in each case in mol/l, and is in the range of from 1 to 200.

19. The process as claimed in claim 18, wherein the quotient is in the range of from 2 to 100.

20. The process as claimed in claim 19, wherein the quotient is in the range of from 2.5 to 75.

* * * * *

UNITED STATES PATENT AND TRADEMARK OFFICE
CERTIFICATE OF CORRECTION

PATENT NO. : 6,362,298 B2
DATED : March 26, 2002
INVENTOR(S) : Dolle et al.

It is certified that error appears in the above-identified patent and that said Letters Patent is hereby corrected as shown below:

Column 9,
Line 9, delete "organoaluminwn" and insert -- organoaluminum --.
Line 20, delete "dacalin" and insert -- decalin --.

Signed and Sealed this

Eighteenth Day of June, 2002

Attest:

Attesting Officer

JAMES E. ROGAN
Director of the United States Patent and Trademark Office